United States Patent [19]

Laleman

[11] 4,203,674

[45] May 20, 1980

[54] USE OF BLOOD IN THE CEMENT, MORTAR AND CONCRETE INDUSTRY FOR OBTAINING A LIGHTENED MATERIAL

[76] Inventor: Charles Laleman, 80 Ile de Migneaux, Poissy, France, 78300

[21] Appl. No.: 857,413

[22] Filed: Dec. 5, 1977

[30] Foreign Application Priority Data

Dec. 14, 1976 [FR] France .................. 76 37653

[51] Int. Cl.$^2$ ................................. B28C 5/00
[52] U.S. Cl. ............................ 366/2; 106/93; 366/3
[58] Field of Search .................. 366/3, 10, 2, 6, 1, 366/27, 40; 106/91, 92, 93, 108, 115, 314, 90

[56] References Cited

U.S. PATENT DOCUMENTS

| | | | |
|---|---|---|---|
| 1,020,325 | 3/1912 | Stinebaugh | 106/91 |
| 1,995,540 | 3/1935 | Harrison | 366/3 |
| 3,236,504 | 2/1966 | Galer | 366/3 |
| 3,326,535 | 6/1967 | Clercx | 366/3 |
| 3,536,507 | 10/1970 | Klein | 106/92 |
| 3,905,826 | 9/1975 | Ordonez | 106/93 |
| 3,955,992 | 5/1976 | Roberts | 106/93 |
| 3,959,003 | 5/1976 | Ostroot | 106/93 |
| 3,963,507 | 6/1976 | Saito | 106/93 |

*Primary Examiner*—Robert W. Jenkins
*Attorney, Agent, or Firm*—Bacon & Thomas

[57] ABSTRACT

The present invention relates to the use of blood in the construction and building industry, whereby blood and extracts of blood containing haemoglobin are used as air entraining colloids. The recommended process for preparing a lightened material consists in associating a construction element chosen from the cements, mortars and concretes, with at least one air entraining colloid chosen from whole blood, globules, red blood corpuscles and haemoglobin. The invention also relates to the lightened material obtained according to this process.

11 Claims, No Drawings

USE OF BLOOD IN THE CEMENT, MORTAR AND CONCRETE INDUSTRY FOR OBTAINING A LIGHTENED MATERIAL

The present invention relates to a novel use of blood and more particularly to the application of blood in the cement, mortar and concrete industry as means for lightening the constructions and for increasing heat insulation. It also relates to the process for the preparation of light material with the aid of blood, as well as to the products obtained according to said process.

Conventional concrete is known to have a density of the order of 2.2–2.3 kg/dm$^3$, and light concrete to have a density lower than or equal to 1.8 kg/dm$^3$. It is also known that, to lighten concrete, several technical solutions have been recommended in the past, based on the use of aggregates, foams, bubble-generating agents, colloids or even on air occlusion.

According to the classification of light concretes recalled in the Article by Messrs. VENUAT and TRAN-THANH-PHAT, *Revue des Matériaux de Construction*, No. 687, March-April 1974, pages 88–98, "light colloidal concrete" is defined as construction material obtained by simultaneously mixing an air entraining agent, a colloid, cement, water and possibly sand and filler, and which is a type of aerated concrete which differs from foamed concrete by its composition.

One of the aims of the invention is the obtaining of "light colloidal concrete" and of light colloidal mortar by means of blood or a blood extract.

The state of the art relative to light colloidal concrete is described in the articles by Messrs. VENUAT and TRAN-THANH-PHAT *Revue des Matériaux de Construction*, No. 687, (March-April 1974), pages 88–98; No. 693 (March-April 1975), pages 99–106; and No. 699 (March-April 1976), pages 89–94.

Furthermore, it is known that blood or the haemoglobin has already been used in the construction industry without, however, obtaining a lightened material. British Pat. No. 522 172 has proposed haemoglobin at a concentration of 2 to 5% by weight with respect to the weight of the cement with a view to preparing a self-hardening material, and French Pat. No. 376 406(in 1907) and British Pat. No. 19 183 (in 1911) recommended the use of blood as colouring matter; the blood being used in this case in large quantities.

According to the invention, an air entraining agent is proposed in the industry of cements, mortars and concretes, which further presents advantageous colloidal properties and which is used in small quantities, to overcome the insufficiencies of the prior art. Moreover, according to the invention, it is proposed to produce ready-mixed dry light mortars, and to produce a light concrete, particularly a light colloidal concrete which may easily be pumped, projected and extruded.

The use of blood in the construction industry, according to the invention, is characterised in that the blood is used as air entraining agent and colloid and mixed with the mixture of sand and cement with strong stirring at a concentration of 0.1 to 1% by weight with respect to the weight of said mixture of sand and cement, to obtain a lightened material, such as light colloidal mortar and light colloidal concrete.

The term "blood" is here understood to mean whole animal blood or an extract of animal blood containing haemoglobin. The following may be mentioned in particular among the extracts of animal blood which are suitable:

the globules, i.e. all the elements constituted by the red blood corpuscles, the white blood corpuscles and the thrombocytes, this resulting from the elimination of the plasma;

the red blood corpuscles, and the haemoglobin which is the colouring matter of the red corpuscles.

It has been ascertained that, in the blood, it is mainly the red blood corpuscles and the haemoglobin which have the sought after air entraining properties. Therefore, for economical reasons, whole blood or an extract of blood which is more or less rich in red blood corpuscles or haemoglobin may preferably be used, depending on the costs of treating blood.

To facilitate the conservation and storage, the animal blood or extract of animal blood are advantageously brough into powder form either by drying, freeze drying or by applying any other method known per se.

The preferred use of blood according to the invention for obtaining a lightened material consists in associating the blood, the globules, red blood corpuscles or haemoglobin with at least one other colloid.

The process of preparation, according to the invention, of a lightened material is characterised in that at least one air entraining colloid chosen from whole blood, globules, red blood corpuscles and haemoglobin is associated with the construction element chosen from cements, mortars and concretes.

According to a preferred embodiment, the process for preparing a mortar or lightened concrete consists in associating, with stirring and in the presence of mixing water:

(a) a mixture of cement and sand, and (b) at least one air-entraining colloid in powder form chosen from whole blood, globules, red blood corpuscles and haemoglobin, the quantity of air entraining haemoglobin (b) being advantageously comprised between 0.1 and 1% by weight with respect to the weight of the cement contained in mixture (a).

Stirring is one of the essential elements according to the invention. The association, comprising water, the mixture (a), the air entraining colloid (b) and, if necessary, the colloid (c) which will be mentioned hereinbelow, is obtained by means of a mixer working between 100 and 600 r.p.m. Below 100 r.p.m., an insufficient quantity of air is incorporated. The mixer will preferably work at 200 r.p.m., the duration of mixing generally being from 3 to 10 mins.

In the mixture (a), the cement/sand mass ratio may in particular be between 0.3 and 1.5. Of course, light aggregates graded between 0.1 and 25 mm may be added to the cement/sand mixture. These light aggregates may be expanded schist, polystryrene balls, expanded glass, vermiculite, perlite or mica.

To prepare a light colloidal concrete comprising a very stable network of spherical micro air-bubbles, whose diameter is between 1$\mu$ and 1 mm, having a good mechanical resistance and a low density (for example a density of 0.8 to 1.3 kg/dm$^3$ after 28 days), the recommended process consists in associating the mixture (a) of cement and sand with at least one air entraining colloid (b) and at least one other colloid (c). The quantity of colloid (c) is then advantageously between 0.025 and 1% by weight with respect to the weight of the cement contained in the mixture (a).

The colloids (c) which may be used according to the invention, may be constituted, in particular, by cellulosic derivatives, such as degraded starch, esters and ethers of cellulose, alginic derivatives, derivatives of silane and polyalkyleneoxides (e.g. those which contain from 7 to 22 units alkyleneoxide per molecule) and mixtures thereof. The preferred colloids (c) according to the invention are hydroxyethylcellulose, carboxymethylcellulose, hydroxypropylmethylcellulose and polyethyleneoxides, the most advantageous being the polyethyleneoxides as they act not only as colloids but also as foaming agents and thus make it possible to use, if necessary, a quantity of product (b) close to the lower limit given hereinabove. 0.1 to 5% by weight of polyethyleneoxide with respect to the weight of the cement of mixture (a) may advantageously be used.

The association of (a) and (b) and possibly (c) is effected at the moment of mixing with mixing water. According to a similar technique, ready-mixed dry light mortars, may be prepared. The water/cement mass ratio is between 0.35 and 0.45.

Other advantages and features of the invention will be more readily understood on reading the following examples of light colloidal concrete. In particular in Example 1, the colloids (c) used were hydroxyethylcellulose (marketed under the name of "Natrosol" by Hercules-France), carboxymethylcellulose (marketed under the name of "Blanose" by Novacel) and hydroxypropylmethylcellulose (marketed under the name of "Methocel" by Dow Chemical; two varieties of hydroxypropylmethylcellulose designated by Methocel No. 1 and Methocel No. 2 were used). In these Examples, the percentages of air entraining colloid and of colloid are expressed by weight with respect to the weight of the cement contained in mixture (a).

EXAMPLE 1

A light colloidal concrete is prepared by using:
a commercially available cement (cement CPA 400), a silico-calcareous sand graded no higher than 0.8 mm (the cement/sand mass ratio being equal to 1), whole blood powder of animal origin, a colloid, and mixing water in variable proportions.

The various constituents are mixed by means of a mixer working between 100 and 600 r.p.m.

The results obtained after 2, 7 and 28 days shown in Table I hereinbelow, in which:
W/C represents the water/cement mass ratio,
d represents the density of the material
TB represents the tensile strength in bending (in kg/cm$^2$),
and
C represents the simple compressive strength (in kg/cm$^2$) TB and C being determined after conservation in air in the presence of humidity (20° C.; 50% HR).

By proceeding as indicated in the Example given hereinabove, it is possible 1) to incorporate a filler, particularly a calcareous filler, or 2) to replace the sand or a part thereof by a suitable quantity of light aggregates such as for example polystyrene, expanded slag, vermiculite, perlite and expanded schist.

Generally, by playing on the percentage of blood powder or of powder of blood extract containing haemoglobin, on the percentages of colloid and on the modi operandi, in the proportions given hereinabove, the density of the hardened colloidal concrete may be varied from 0.5 to 1.8 kg/dm$^3$ with, correlatively, a simple compressive strength of 5 to 350 kg/cm$^2$.

EXAMPLE 2

A light colloidal concrete is prepared by mixing, for 4 mins. at 200 r.p.m., a composition comprising water, a mixture of 100 kg of sand (graded no higher than 0.2 mm) and of 100 kg cement (CMP 400), 2 kg of blood extract, 0.6 kg of a cellulosic colloid (carboxymethylcellulose) and 0.3 kg of polyethyleneoxide with a view to comparing three products obtained from blood, namely: whole blood powder, powder of red blood corpuscles and powder of ox plasma, the latter not containing haemoglobin, the water/cement mass ratio (W/X) being 0.42.

The density (d) of the material thus obtained as well as the TB and C strengths are determined after 7 and 28 days, as defined in Example 1. The results given in Table II show that the powders containing haemoglobin (whole blood powder and powder of red blood corpuscles) lead to lower densities.

EXAMPLE 3

A light colloidal mortar is prepared by mixing, for 4 mins. by means of a mixer working at 200 r.p.m., water, cement (CPA 400), sand graded no higher than 0.1 mm and a mixture of colloids (hydroxyethylcellulose and whole blood powder in a mass ratio 0.3:1), the water/cement (W/C) mass ratio being 0.42.

For the material obtained at each test, the apparent density is measured (in kg/m$^3$) as well as the TB and C strengths, after 7 and 28 days (in kg/cm$^2$), the heat conductivity when dry (in W/m$^{2°}$ C.) and shrinkage after 28 days. The results are shown in Table III hereinbelow.

When fresh, the light colloidal mortar obtained according to each test of Example 3 is fat adhering well to the support. It can easily be pumped and is projectable with the mortar-gun. The vibrations, pumping and projection do not destroy the micro-air bubbles.

The setting time of the light colloidal mortar is slightly extended, this giving the material a longer application time, but is is possible to accelerate it by means of an accelerator known per se.

The heat shrinkage of this material is of the same order of magnitude as that of a conventional concrete (10 $\mu$/m/° C.). Moreover, as shown by the result of Table III hereinbelow, the compressive strengths obtained after 28 days of conservation in damp (20° C.; 50% H.R.) are:
50 kg/cm$^2$ for the economical mixture (low colloid content) of light colloidal mortar of density 1100 kg/m$^3$, and
212 kg/cm$^2$ for the light colloidal mortar of density 1500 kg/m$^3$.

The ratio TB/C varies between 0.60 and 0.30 according to the density, instead of 0.15 to 0.20 for conventional concretes. The substantial increase of this ratio translates a considerable reduction in the fragility of the material and a great faculty of accommodation under the pulling forces.

The hydraulic shrinkage after setting of the light colloidal mortar is greater than that of a concrete in view of the high content of fine elements, but, what is important in a lining, is the fissurability. The modulus of elasticity of the light colloidal mortar according to the invention is of the order of 60 000 kg/cm$^2$, or about 1/5 of that of a conventional concrete, in other words, with equal stresses, the mortar according to the invention deforms five times more than a conventional concrete. It is this deformability which protects this light material against cracks. The high resistance to cracking and the plasticity are due to the presence of numerous air bubbles which stop the possible micro-cracks, similarly to a hole which is made at the end of a crack in a window to stop propagation thereof.

The light colloidal mortar is only slightly capillary and is perfectly resistant to the freezing-thaw cycles. Finally, the dimensional variations (swelling/shrinking) during the drying/humidification cycles are substantially the same as those of a conventional concrete.

In view of these properties, the light colloidal mortar according to the invention is perfectly usable in the domains of single-layer linings and outer insulating linings.

EXAMPLE 4

A light colloidal concrete containing light aggregates is prepared from water, cement (CPA 400), sand (graded no higher than 0.1 mm) light aggregates (expanded schist, polystyrene, expanded slag, vermiculite or perlite) and a mixture of colloids (hydroxypropylcellulose and whole blood powder in the mass ratio 0.3:1). All the ingredients are mixed for 4 mins. at 200 r.p.m. and, for each test, the apparent density, the TB and C strengths after 7 and 28 days, the heat conductivity when dry (in W/m$^2$·°C.) and the hydraulic shrinkage after 28 days (in $\mu$/m) are measured. The results are given in Table IV hereinbelow, where (i) the grading of the light aggregates is given in mm and (ii) the weight of the mixture of colloids (b+c) is expressed in percentage with respect to the weight of the cement.

The light colloidal concrete thus obtained is perfectly well projectable with a gun. By way of example and to illustrate its use, it may be specified that good results from the point of view of heat insulation were obtained by depositing an outer insulating lining comprising a layer of light colloidal concrete containing light aggregates, of 2 to 6 cm, and a finishing layer of light colloidal mortar according to Example 3, of 2 cm.

EXMAPLE 5

A light colloidal concrete is prepared according to the process described in Example 2, but using whole blood powder as air entraining colloid (b) and polyethyleneoxide as colloid (c). The results given in Table V hereinbelow show that a final product is obtained having good properties with small quantities of blood (0.1 to 0.2% by weight with respect to the weight of the cement).

TABLE I

| No. of test | Air-entraining agent | Colloid | W/C | 2 days d | 2 days TB | 2 days C | 7 days d | 7 days TB | 7 days C | 28 days d | 28 days TB | 28 days C |
|---|---|---|---|---|---|---|---|---|---|---|---|---|
| 1 | 0 50% blood powder | 0.15% Methocel n° 1 | 0.42 | 1.39 | 16 | 44 | 1.27 | 34 | 107 | 1.26 | 36 | 117 |
| 2 | 0 25% blood powder | 0.25% Blanose | 0.44 | 0.99 | 0 | 0 | 0.87 | 6 | 21 | 0.85 | 9 | 27 |
| 3 | 0 15% blood powder | 0.25% Blanose | 0.44 | 1.03 | 0 | 0 | 0.92 | 13 | 26 | 0.91 | 18 | 27 |
| 4 | 0 50% blood powder | 0.15% Methocel n° 2 | 0.44 | 1.30 | 14 | 32 | 1.19 | 31 | 84 | 1.17 | 33 | 91 |
| 5 | 0 50% blood powder | 0.15% Methocel n° 2 | 0.42 | 1.26 | 16 | 47 | 1.18 | 29 | 89 | 1.16 | 32 | 95 |
| 6 | 0 50% blood powder | 0.10% Methocel n° 2 | 0.42 | 1.24 | 16 | 43 | 1.15 | 28 | 80 | 1.12 | 33 | 88 |
| 7 | 0 50% blood powder | 0.05% Methocel n° 2 | 0.42 | 1.28 | 16 | 50 | 1.20 | 25 | 87 | 1.17 | 31 | 94 |
| 8 | 0 50% blood powder | 0.025% Methocel n° 2 | 0.42 | 1.26 | 17 | 46 | 1.19 | 28 | 84 | 1.16 | 30 | 89 |
| 9 | 0 50% blood powder | 0.10% Natrosol | 0.42 | 0.9 | 6 | 11 | 0.83 | 9 | 23 | 0.82 | 11 | 25 |
| 10 | 0 25% blood powder | 0.10% Natrosol | 0.42 | 1.07 | 7 | 17 | 0.99 | 18 | 39 | 0.98 | 22 | 45 |

TABLE II

| Blood extract | d | Strength 2 days TB | Strength 2 days C | Strength 7 days TB | Strength 7 days C | Strength 28 days TB | Strength 28 days C |
|---|---|---|---|---|---|---|---|
| Whole blood powder | 1.10 | 16 | 50 | 25 | 87 | 31 | 94 |
| Powder of red blood corpuscles | 1.13 | 18 | 49 | 31 | 89 | 31 | 95 |
| powder of ox plasma | 1.45 | 32 | 106 | 47 | 179 | 49 | 195 |

TABLE III

| No. of test | Apparent density when dry kg/m$^3$ | Composition in kgm$^3$ Cement | Composition in kgm$^3$ Sand | Mixture of colloids | Strength 2 days TB | Strength 2 days C | Strength 7 days TB | Strength 7 days C | Strength 28 days TB | Strength 28 days C | Heat conductivity when dry (W/m$^2$/°C.) | Hydraulic shrinkage after 28 days (u/m) |
|---|---|---|---|---|---|---|---|---|---|---|---|---|
| 11 | 1100 | 490 | 490 | 1% | 16 | 50 | 25 | 87 | 31 | 94 | 0.35 | 1500 |
| 12 | 1200 | 530 | 530 | 0.6% | 22 | 65 | 31 | 104 | 32 | 109 | 0.39 | 1550 |
| 13 | 1300 | 580 | 580 | 0.5% | 24 | 80 | 38 | 132 | 39 | 151 | 0.43 | 1310 |
| 14 | 1500 | 650 | 650 | 0.3% | 31 | 108 | 44 | 181 | 47 | 212 | 0.50 | 1370 |

TABLE IV

| NO. of test | Apparent density when dry (kg/m³) | Composition per m³ cement (kg) | sand (kg) | Quantity aggregates (grading) | Mixture of colloids | Strength 2 days TB | C | Strength 7 days TB | C | Strength 28 days TB | C | Heat conductivity when dry (W/m²/°C.) | Hydraulic shrinkage after 28 days |
|---|---|---|---|---|---|---|---|---|---|---|---|---|---|
| 15 | 500 | 180 | 180 | 310 liters (0.3–0.8mm) 800 litres (1.6–2.5 mm) | 0 40% | 6 | 18 | 10 | 35 | 12 | 42 | 0 10 | 1180 |
| 16 | 900 | 180 | 180 | 320 liters (0.3–0.8 mm) 800 liters (0.8–1.6 mm) | 0 35% | 7 | 42 | 12 | 80 | 15 | 102 | 0 22 | 980 |
| 17 | 1100 | 210 | 210 | 310 liters (0.5–0.8 mm) 800 liters (1.2–2 mm) | 1% | 12 | 65 | 23 | 118 | 26 | 175 | 0 35 | 860 |
| 18 | 1450 | 300 | 300 | 440 liters (0.1–0.4 mm) 880 liters (0.5–0.8 mm) | 0 3% | 21 | 138 | 36 | 286 | 48 | 345 | 0 45 | 620 |

TABLE V

| No. of test | Blood powder | Polyethyleneoxyde | W/C | 2 days d | TB | C | 7 days d | TB | C | 28 days d | TB | C |
|---|---|---|---|---|---|---|---|---|---|---|---|---|
| 1% | 15 | 2% | 0.62 | 0.93 | 7 | 12 | 0.93 | 10 | 24 | 0.85 | 11 | 31 |
| 20 | 0.5% | 0.15% | 0.42 | 0.96 | 11 | 30 | 0.96 | 14 | 37 | 0.86 | 16 | 47 |
| 21 | 0.3% | 0.1% | 0.42 | 1.06 | 11 | 43 | 1.06 | 17 | 56 | 0.95 | 18 | 65 |
| 22 | 0.2% | 0.1% | 0.41 | 1.32 | 16 | 81 | 1.31 | 21 | 100 | 1.22 | 23 | 123 |

What I claim is:

1. A process for preparing a light weight cementitious material, wherein:
   (a) a mixture of cement and of sand, and
   (b) at least one air entraining colloid in powder form selected from the group consisting of dried whole blood, globules, red corpuscles and haemoglobin,
are associated together with stirring, in the presence of water, the quantity of air entraining colloid being between 0.1 and 1% by weight with respect to the weight of the cement contained in the mixture (a).

2. A process as claimed in claim 1, wherein at least one colloid (c) is associated with (a) and (b).

3. A process as claimed in claim 2, wherein the quantity of colloid (c) is between 0.025 and 1% by weight with respect to the weight of the cement contained in the mixture (a).

4. A process as claimed in claim 2, wherein the colloid (c) is chosen from hydroxyethylcellulose, hydroxypropylmetylcellulose, carboxymethylcellulose, and the polyethyleneoxides.

5. A process as claimed in claim 2, wherein light aggregates graded between 0.1 and 25 mm are associated with mixture (a).

6. A process as claimed in claim 1, wherein the mixture of (a) and (b) is made with stirring by means of a mixer working between 100 and 600 r.p.m. and preferably at 200 r.p.m.

7. A process as claimed in claim 1, wherein, in mixture (a), the cement/sand mass ratio is between 0.3 and 1.5.

8. A process as claimed in claim 1, wherein light aggregates graded between 0.1 and 25 mm are associated with mixture (a).

9. Material obtained according to the process as claimed in claim 1.

10. A process as claimed in claim 1 wherein the cementitious material is mortar.

11. A process as claimed in claim 1 wherein the cementitious material is concrete.

* * * * *